(12) United States Patent
Romero Legorreta et al.

(10) Patent No.: US 9,748,024 B2
(45) Date of Patent: Aug. 29, 2017

(54) PASSIVE ARC CONTROL WITH SEQUESTERED PHASES IN A VERTICAL BUS SYSTEM OF A MOTOR CONTROL CENTER

(71) Applicant: SCHNEIDER ELECTRIC USA, INC., Palatine, IL (US)

(72) Inventors: German Romero Legorreta, Guadalupe (MX); Tim Faber, Marion, IA (US); Walter J J. Richards, Murfreesboro, TN (US)

(73) Assignee: Schneider Electric USA, Inc., Andover, MA (US)

( * ) Notice: Subject to any disclaimer, the term of this patent is extended or adjusted under 35 U.S.C. 154(b) by 229 days.

(21) Appl. No.: 14/557,817

(22) Filed: Dec. 2, 2014

(65) Prior Publication Data

US 2015/0372461 A1 Dec. 24, 2015

Related U.S. Application Data

(63) Continuation-in-part of application No. 14/310,660, filed on Jun. 20, 2014, now Pat. No. 9,312,668.

(51) Int. Cl.
*H02B 11/04* (2006.01)
*H01B 17/42* (2006.01)
(Continued)

(52) U.S. Cl.
CPC ............. *H01B 17/42* (2013.01); *H02B 11/24* (2013.01); *H02B 1/21* (2013.01); *H02B 11/04* (2013.01)

(58) Field of Classification Search
None
See application file for complete search history.

(56) References Cited

U.S. PATENT DOCUMENTS 2,563,441 A * 8/1951 Wood .................. H02B 11/133
174/50
3,121,144 A 2/1964 Tjebben
(Continued)

FOREIGN PATENT DOCUMENTS

DE 10 2011 000837 A1 8/2012
EP 2110826 10/2009
WO WO2011000838 1/2011

OTHER PUBLICATIONS

Model 6 Export Motor Control Centers, Bulletin No. 80446-300-01A, Square D Company, Oct. 2001.

*Primary Examiner* — Courtney Smith
(74) *Attorney, Agent, or Firm* — Locke Lord LLP

(57) ABSTRACT

A passive arc control system for a motor control center 60 includes an arc attenuating box having sides separating adjacent vertical bus bar phases 54, providing a physical barrier to arc flash energy. The box is open at its top and bottom forming a chimney 55. A shutter assembly for each box includes an insulator cap 62 on a free end of the bus bar and an independently moveable, box-shaped shutter 64 that slides along the bus bar away from the insulator cap, when a device is connected to the bus bar. The shutter has an opening 65 through which the bus bar passes when the device is connected to the bus bar and an opening 55' aligned with the box's chimney. The arc control system provides a high degree of arc protection for personnel working around open motor control centers and is highly modular and easy to construct.

9 Claims, 8 Drawing Sheets

(51) Int. Cl.
*H02B 11/24* (2006.01)
*H02B 1/21* (2006.01)

(56) References Cited

U.S. PATENT DOCUMENTS

| | | | |
|---|---|---|---|
| 3,142,003 A | 7/1964 | Olashaw | |
| 3,610,850 A | 10/1971 | Eichelberger | |
| 4,033,660 A | 7/1977 | Ericson et al. | |
| 4,038,585 A * | 7/1977 | Wolski | H02B 1/36 200/50.22 |
| 4,090,230 A * | 5/1978 | Fuller | H02B 1/36 361/617 |
| 4,139,748 A | 2/1979 | Wolfe et al. | |
| 4,486,815 A * | 12/1984 | Takahashi | H02B 11/24 200/50.22 |
| 4,789,919 A | 12/1988 | Cox et al. | |
| 4,926,286 A * | 5/1990 | Maki | H02B 1/14 200/50.17 |
| 5,343,355 A * | 8/1994 | Ishikawa | H02B 11/24 200/304 |
| 5,486,663 A | 1/1996 | Fritsch et al. | |
| 5,497,287 A * | 3/1996 | Yee | H02B 1/14 361/617 |
| 5,510,960 A | 4/1996 | Rosen | |
| 6,337,449 B1 | 1/2002 | Brouillat et al. | |
| 6,414,839 B1 * | 7/2002 | Derksen | H02B 11/24 200/50.22 |
| 6,472,971 B2 | 10/2002 | Toyama et al. | |
| 6,486,421 B1 | 11/2002 | Jones et al. | |
| 6,954,060 B1 | 10/2005 | Edel | |
| 7,795,551 B2 | 9/2010 | Narayanan et al. | |
| 8,242,395 B2 | 8/2012 | Josten et al. | |
| 8,331,081 B2 | 12/2012 | Abrahamsen et al. | |
| 8,333,600 B2 | 12/2012 | Yanniello | |
| 8,476,992 B2 | 7/2013 | Yang et al. | |
| 9,123,488 B2 | 9/2015 | Seo | |
| 2005/0258922 A1 | 11/2005 | Rowe et al. | |
| 2006/0067018 A1 | 3/2006 | Malkowski, Jr. et al. | |
| 2007/0111575 A1 | 5/2007 | Jensen et al. | |
| 2008/0079436 A1 | 4/2008 | Gollhardt et al. | |
| 2008/0258667 A1 | 10/2008 | Morris et al. | |
| 2009/0000926 A1 | 1/2009 | Buxton et al. | |
| 2010/0084920 A1 | 4/2010 | Banting et al. | |
| 2010/0110049 A1 | 5/2010 | Lehtola et al. | |
| 2010/0118473 A1 | 5/2010 | Morris et al. | |
| 2010/0280775 A1 | 11/2010 | Schafer et al. | |
| 2011/0149478 A1 | 6/2011 | Shea et al. | |
| 2011/0149480 A1 | 6/2011 | Leeman et al. | |
| 2011/0252845 A1 | 10/2011 | Webb et al. | |
| 2012/0013227 A1 | 1/2012 | Josten et al. | |
| 2012/0039061 A1 | 2/2012 | McBee et al. | |
| 2012/0064746 A1 | 3/2012 | Bellows et al. | |
| 2012/0127636 A1 | 5/2012 | Abrahamsen et al. | |
| 2012/0228097 A1 | 9/2012 | Gemme et al. | |
| 2012/0314340 A1 | 12/2012 | Faber et al. | |
| 2013/0279083 A1 * | 10/2013 | Faber | H02B 13/025 361/618 |
| 2015/0171605 A1 | 6/2015 | Jo et al. | |
| 2016/0036204 A1 | 2/2016 | Schroeder | |
| 2016/0248232 A1 | 8/2016 | Richards et al. | |
| 2016/0322790 A1 * | 11/2016 | Becerra Becerra | H02B 1/14 |

\* cited by examiner

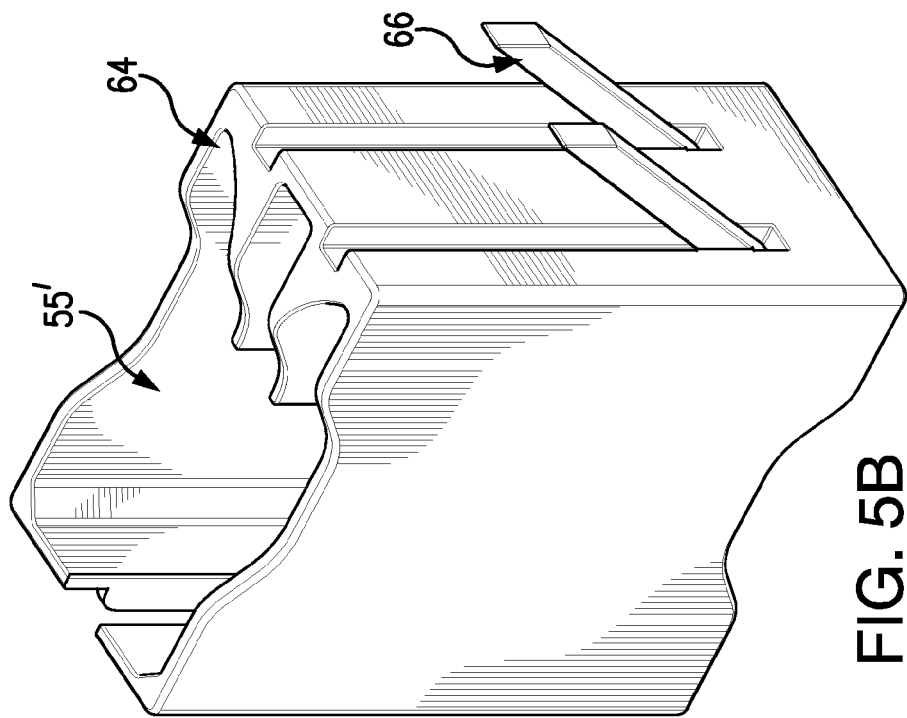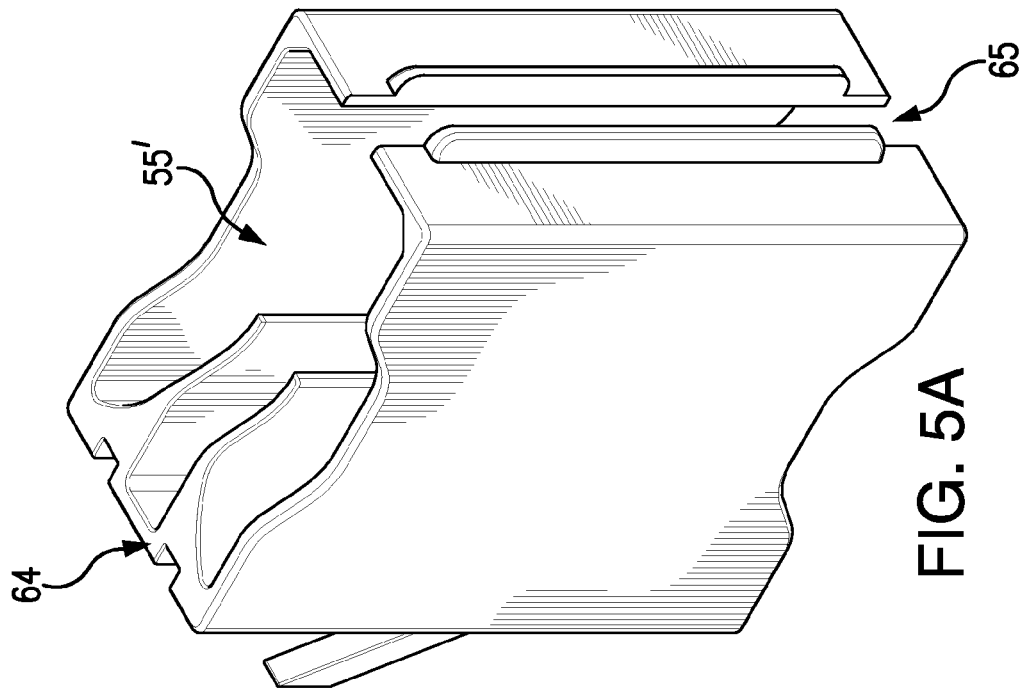

PASSIVE ARC CONTROL WITH SEQUESTERED PHASES IN A VERTICAL BUS SYSTEM OF A MOTOR CONTROL CENTER

The present U.S. Patent Application is a Continuation-In-Part (CIP) of co-pending Parent U.S. patent application Ser. No. 14/310,660, filed Jun. 20, 2014, of which the entire disclosure is incorporated herein by reference. The Applicant claims benefit of the priority filing date of the co-pending Parent U.S. patent application Ser. No. 14/310,660 under 35 U.S.C. 120, for claims made in the present U.S. Patent Application, which are directed to the subject matter disclosed in the parent application.

BACKGROUND OF THE INVENTION

1. Field of the Invention

The invention disclosed relates to arc resistant electrical distribution equipment.

2. Discussion of the Related Art

Circuit breakers are used in motor control units, wherein the motor control unit may be inserted or removed from a motor control center (MCC) switchgear cabinet without shutting down all power to the cabinet. The motor control units have a connected position in which female connectors of the breakers are connected to respective bus bars, and a disconnected position in which the female connectors are disconnected from the bus bars. To cover access to, and prevent inadvertent contact with, the bus bars when the motor control unit is in the disconnected position, a common shutter system has been utilized across all power phases supplying the motor control unit.

Motor control units may have the requirement of making and breaking connections with installed bus bars or bus bar extensions i.e. the incoming power conductors contained in the MCC. The making and breaking of connections and the handling of heavy currents in the area of connection between control devices like circuit interrupters (breakers), makes this area of the cabinet particularly susceptible to arcing. An arc flash is the rapid release of energy due to an arcing fault between phases, neutral or ground contacts. The resulting arc flash has the potential to cause considerable damage, including arcing-induced erosion of the contacts and injury to operators. The temperature of an arc flash may be capable of vaporizing metal and sending a blast of plasma and molten metal in all directions with extreme force. Damage may be caused to the switchgear both by the explosion of the arc flash and by the heat radiating from the blast. It is important to minimize the potential for harm to equipment and people by containing and redirecting the arc energy out from the switchgear and away from personnel.

Arc resistance pertains to the ability to withstand the destructive energy released during an arc flash, by interrupting and channeling the energy away from personnel and adjacent equipment. Passive arc resistance may include directed venting of the arc flash energy and gases out of the switchgear and reinforcement of the switchgear structure to withstand the blast. An example of passive arc resistance from the applicant features so-called arc-block technology which provides capability to passively attenuate and extinguish arc events, and which is described in the co-pending US Patent Application Ser. No. 13/452,145, filed Apr. 20, 2012, entitled "Passive Arc Management System With Flue Chamber", of common ownership herewith. The co-pending application describes an electrical distribution cabinet has an arc attenuating chamber surrounding the electrical connection point between a cluster, i.e. electrical power connector, of a draw out circuit breaker and a bus bar extension. The arc attenuating chamber is formed by sliding a cluster shield surrounding a cluster at the back of the breaker, into a slightly larger arc attenuating box that surrounds the bus bar extension, so that the leading edges of the cluster shield and arc attenuating box overlap and form the chamber. The arc attenuating chamber provides a flue channel that lengthens the arc and attenuates the current and temperature until the arc is extinguished.

SUMMARY OF THE INVENTION

Example embodiments of the invention minimize the potential for harm to equipment and people by containing and redirecting the arc energy out from the MCC.

In an example embodiment of the invention, an independently-moveable arc-resistant shutter assembly fits inside an arc attenuating box surrounding and sequestering an individual, vertical bus bar phase at the point of electrical connection between a circuit interrupting device, and the vertical bus bar. Sides of the arc attenuating box with overlaping geometry separate and sequester one vertical bus bar phase from an adjacent vertical bus bar phase, a physical barrier to arc flash energy and gases intruding into an adjacent box surrounding an adjacent bus bar. The arc attenuating box is open at its top and bottom to form a chimney along the vertical bus bar to provide directed venting out of the MCC, of arc flash energy and gases originating at the point of electrical connection. The point of connection will typically be referred to as the female connector of a motor control unit. The terms circuit interrupting device and circuit breaker may be used interchangeably herein and will be understood by the person having ordinary skill in the art to have the broader meaning.

The shutter assembly includes an insulator cap on a free end of the vertical bus bar. The shutter assembly includes an independently moveable, box-shaped shutter composed of an insulator material, which slides horizontally within the arc attenuating box. The shutter is slideable along the vertical bus bar away from the insulator cap, in response to a force applied by a leading edge of a connector assembly for the circuit interrupting device, when the device is being connected to the vertical bus bar. The main body of the shutter has an opening through which the vertical bus bar passes when the device is connected to the vertical bus bar.

The independently moveable, box-shaped shutter is open top to bottom, with the opening aligned with the top to bottom opening in the arc attenuating box, in both the connected and disconnected positions of the device, as part of the chimney formed along the vertical bus bar.

The arc attenuating box includes a front portion that fits over the free end of the vertical bus bar, the front portion of the arc attenuating box having sides with a rear-facing mating surface. The arc attenuating box further includes a rear portion that fits over a rear portion of the vertical bus bar, the rear portion of the arc attenuating box having sides with a front-facing mating surface. The rear-facing mating surface of the front portion of the arc attenuating box is configured to mate with the front-facing mating surface of the rear portion of the arc attenuating box to form the sides of the arc attenuating box. The insulator cap on a free end of the vertical bus bar may be formed as an integral part of the front portion of the arc attenuating box. Alternately, the insulator cap may be a coating of insulator material on the free end of the vertical bus bar.

The shutter assembly provides a physical barrier to debris, tools, and operator fingers, denying access to the vertical bus bar when the device, i.e. breaker, is disconnected from the vertical bus bar. The passive arc control system of the present invention may prevent hazardous arc flash exposure to personnel even with the front door of the motor control center open or the motor control units in their unconnected positions.

In embodiments, such as in a motor control unit, the connector assembly may include a female connector of the circuit breaker and its connector protector and/or its fixed shroud. In still other embodiments, the connector assembly may be solely the connector, such as a female connector. The independently moveable, box-shaped shutter is arranged to be contacted and moved by the connector assembly, when the circuit interrupter device is being connected to the power supply from the vertical bus bar.

When the circuit interrupter device is disconnected from the vertical bus bar, the moveable, box-shaped shutter slides horizontally along the vertical bus bar toward the insulator cap, in response to a force applied by a spring. In the disconnected position, the insulator cap fits closely within the opening in the shutter, thereby providing the physical barrier to debris, tools, and operator fingers, denying access to the vertical bus bar.

The shutter is a reinforced structure composed of an insulator material, which is a simple and strong design able to resist the destructive energy released during an arc flash. The shutter assembly comprising the shutter and insulator cap, fits within the arc attenuating box of an individual phase, and is thus reliable while being easy to make and use.

The motor control unit is configured to be inserted into the MCC. The motor control unit may have an exterior face of its rear wall configured to be located adjacent to the vertical bus bars when the motor control unit has been inserted into the motor control center. The motor control unit may include connector assemblies moveably mounted in the motor control unit, each of the connector assemblies being configured to electrically connect to a respective vertical bus bar, when the connector assembly is moved toward the power bus. The connector assembly may comprise a female connector and one or both of a connector protector surrounding the female connector, and a fixed shroud surrounding the connector protector. A leading edge of the female connector may apply the force on the shutter to slide the shutter along the vertical bus bar away from the insulator cap, when in the connected position.

In an example embodiment of the invention, a row of front portions of a plurality of arc attenuating boxes may be grouped together as a front cover. Each front portion of the plurality of arc attenuating boxes may be configured to fit over a free end of a respective one of a plurality of vertical bus bar phases in the MCC. A row of rear portions of the plurality of arc attenuating boxes may be grouped together as a rear cover. Each rear portion of the plurality of arc attenuating boxes may be configured to fit over a rear end opposite to the free end of a respective one of the plurality of vertical bus bar phases. The front cover and the rear cover may be configured to snap together, with the front portion of the arc attenuating boxes fitting over the free end of the vertical bus bar phases and the rear portion of the arc attenuating boxes fitting over the rear end of the vertical bus bar phases, each arc attenuating box surrounding an individual vertical bus bar phase. Each arc attenuating box may be configured to provide a physical barrier to arc flash energy and gases intruding into an adjacent one of the arc attenuating boxes surrounding an adjacent vertical bus bar phase. Each arc attenuating box may be open at its top and bottom to form a chimney along a respective vertical bus bar phase, to provide directed venting of arc flash energy and gases out of the motor control center.

The motor control center may have additional rows of arc attenuating boxes, with each arc attenuating box surrounding an individual one of the vertical bus bar phases. Each arc attenuating box in the additional rows may be open at its top and bottom to form a chimney along a respective vertical bus bar phase, the chimney being aligned with the chimney of an arc attenuating box of other rows of arc attenuating boxes, to provide directed venting of arc flash energy and gases out of the motor control center.

DESCRIPTION OF THE FIGURES

FIG. 5A is a front perspective view from the left side, of an independently moveable, box-shaped shutter, showing the opening through which the vertical bus bar passes when the motor control unit is connected to the vertical bus bar.

FIG. 5B is a rear perspective view from its right side, of the independently moveable, box-shaped shutter of FIG. 5A, showing a spring on the rear of the shutter, wherein the shutter slides horizontally along the vertical bus, in response to a force applied by the spring, when the motor control unit is disconnected from the vertical bus bar.

DETAILED DESCRIPTION OF EMBODIMENTS OF THE INVENTION

Figure 1:
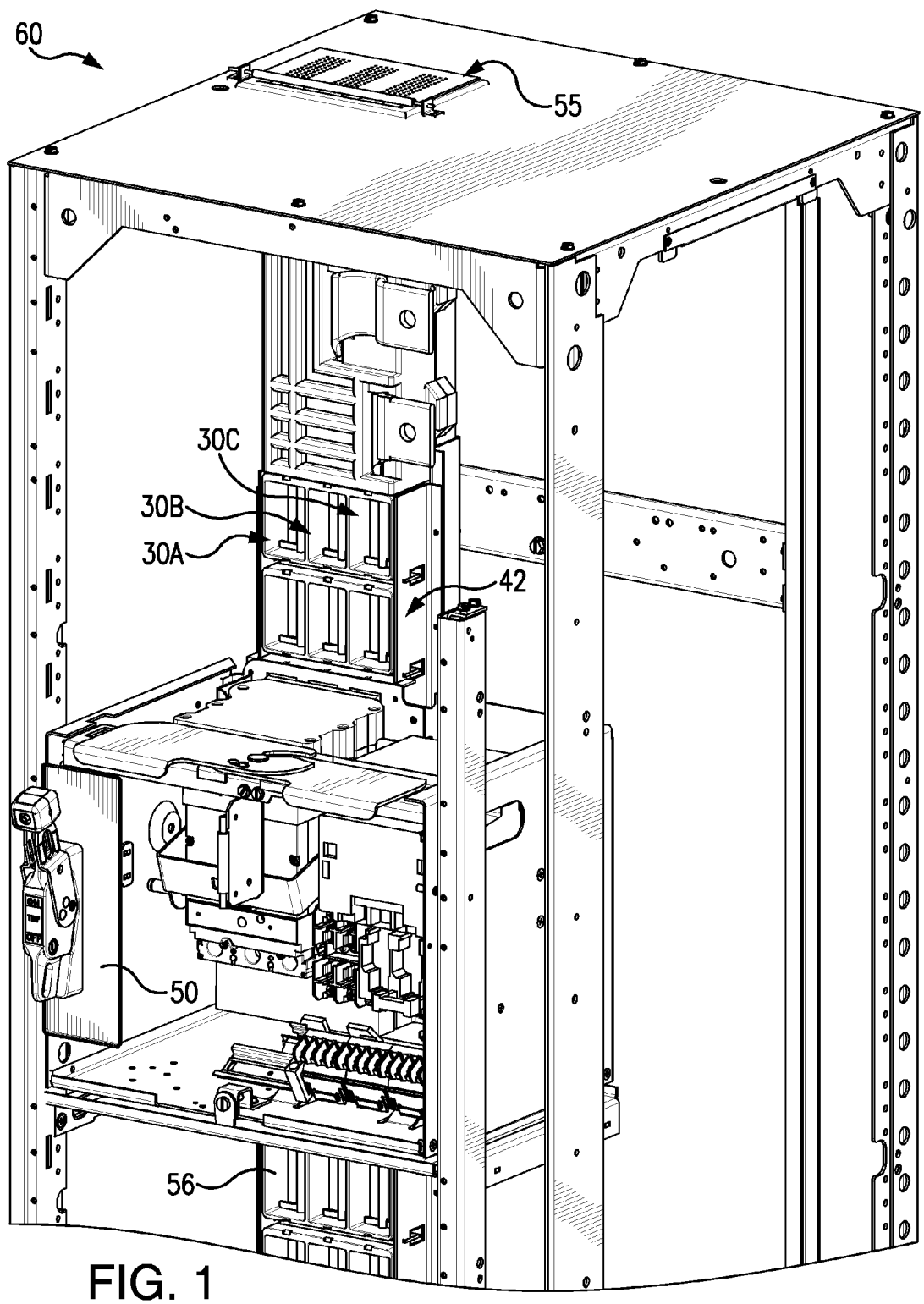
FIG. 1 a front perspective view from the right side, of a partially assembled motor control center (MCC) cabinet into which has been inserted a partially assembled motor control unit for connection to vertical bus bars via arc attenuating boxes shown lining the rear of the cabinet.

FIG. 1 is a front perspective view from the right side, of a motor control center (MCC) cabinet 60 into which has been inserted a motor control unit 50 for connection to three vertical bus bar phases 54A, 54B, and 54C (shown in FIGS. 2 and 3) via a front portion 30A, 30B, and 30C of three arc attenuating boxes A, B, and C (shown in FIG. 7) supported in the MCC cabinet 60 by a front bus frame comprising a vertical support 42. Each of the front portions 30A, 30B, and 30C of the three arc attenuating boxes A, B, and C forms part of a chimney 55 along the respective three vertical bus bar phases 54A, 54B, and 54C, to provide directed venting of arc flash energy and gases out of the MCC cabinet 60. The motor control unit 50 is not normally connected to the bus bars when the unit is initially racked into the MCC cabinet 60. The motor control unit has a handle-cam mechanism (not shown) to rack-in the unit into the MCC cabinet, which mechanically locks the motor control unit into place in the MCC cabinet. The operator must then actuate a separate connect/disconnect handle on the front of the motor control unit, to advance movable female connectors, which can be clip-like conductive structures of the motor control unit, to electrically connect them to the bus bars.

Figure 2:
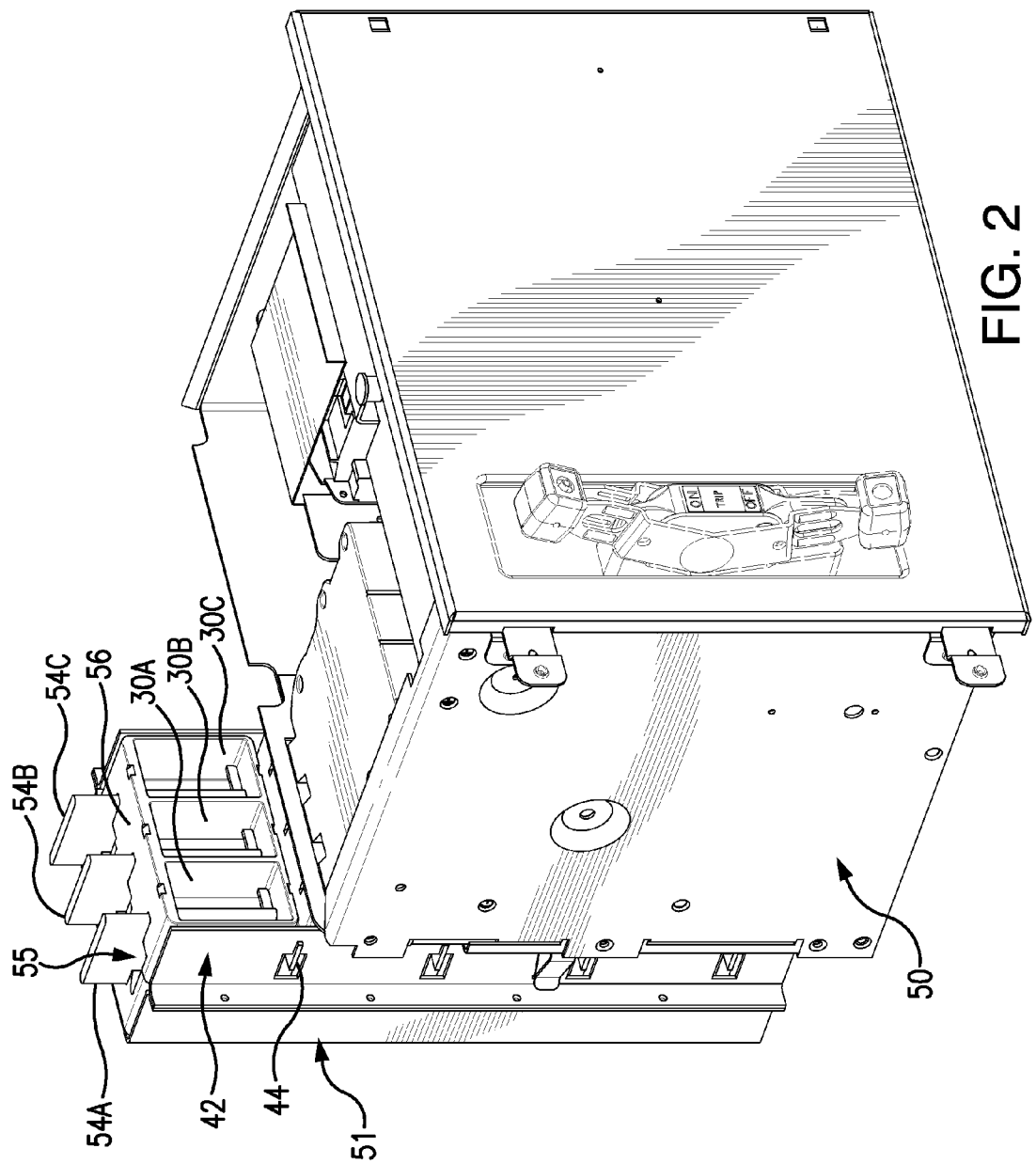
FIG. 2 is a front perspective view from the left side, of the motor control unit in a connected position to vertical bus bars, via arc attenuating boxes mounted in a rear bus frame in the motor control center cabinet (not shown).
Figure 7:
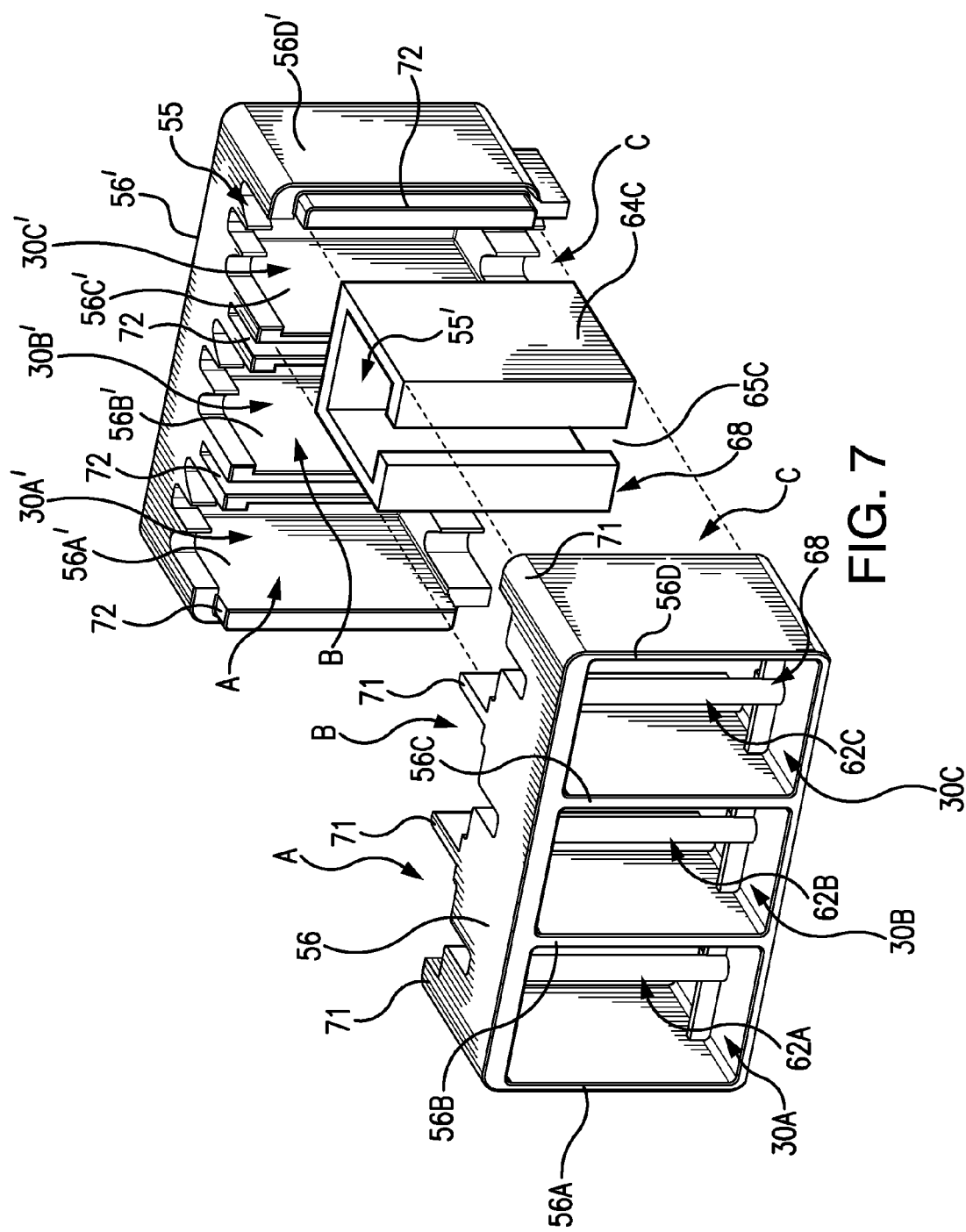
FIG. 7 is a front perspective, exploded view from the top, right side of the front portion of the arc attenuating boxes, the independently moveable, box-shaped shutter, and the rear portion of the arc attenuating boxes.
Figure 8:
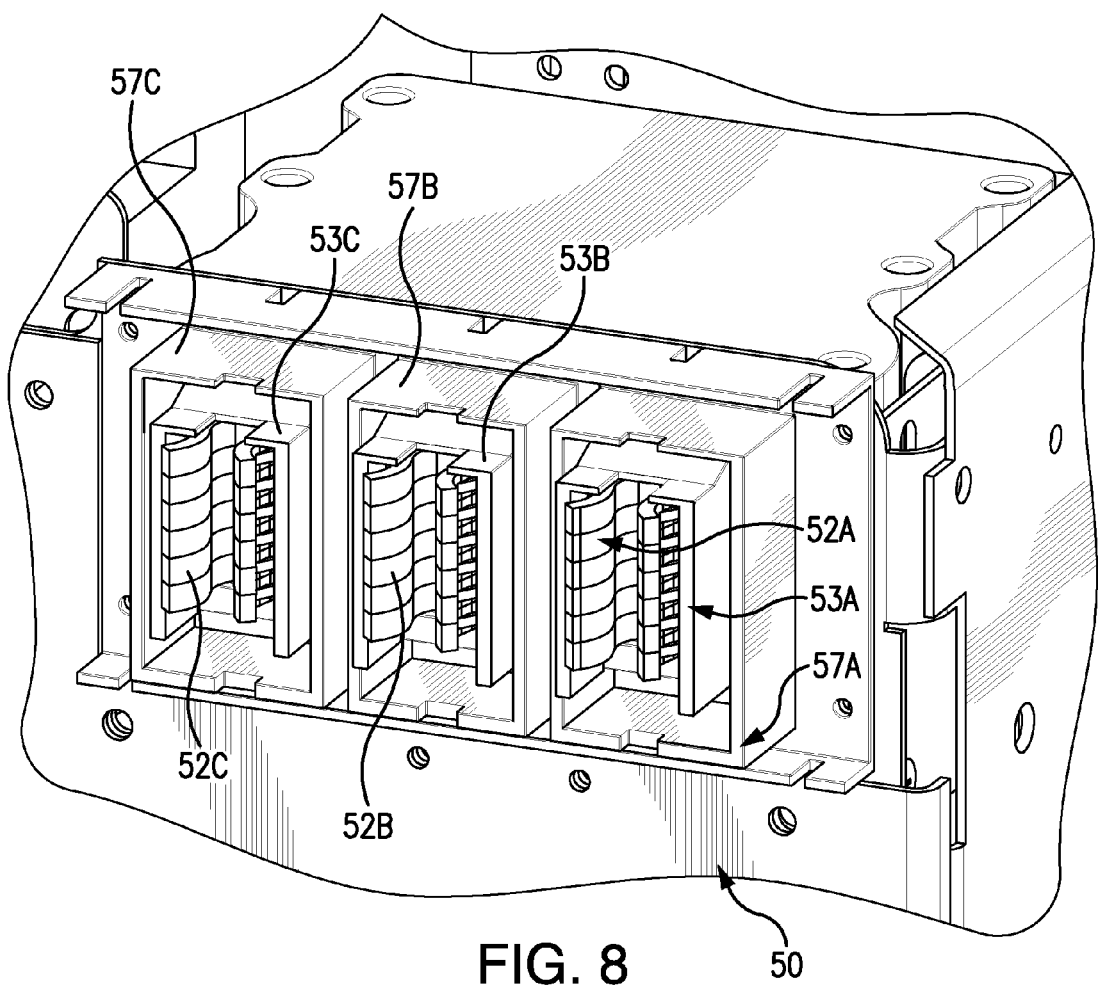
FIG. 8 is a top, rear perspective view from the right, of the motor control unit, showing the female connector projecting out in a position to apply a force on the shutter to slide the shutter along the bus bar away from the insulator cap, when in the connected position.

FIG. 2 is a front perspective view from the left side, of the motor control unit 50 in a connected position to the vertical bus bar phases 54A, 54B, and 54C, via the front portions 30A, 30B, and 30C of the three arc attenuating boxes A, B, and C (shown in FIG. 7). The figure shows the vertical support 42, a horizontal support 44, and a rear bus frame 51 in the motor control center cabinet 60 (not shown). An exterior face of a rear wall of the motor control unit 50 (shown in FIG. 8) is configured to be located adjacent to the vertical bus bar phases 54A, 54B, and 54C when the motor control unit 50 has been inserted into the MCC cabinet 60. Referring also to FIG. 8, connector assemblies of a circuit breaker in the motor control unit 50, are connected to the vertical bus bar phases 54A, 54B, and 54C. A connector assembly is comprised of a female connector, for example 52A (collectively 52A, 52B, 52C), and one or both of a connector protector, e.g. 53A, surrounding the female connector 52A, and a fixed shroud 57A surrounding the connector protector 53A. In other embodiments, the connector assembly may be solely the connector, such as the female connector. Each front portion 30A, 30B, and 30C of the arc attenuating box A, B, and C fits over a free end of an individual, vertical bus bar phase 54A, 54B, 54C at a point of electrical connection between motor control unit 50 and the vertical bus bar.

Figure 3:
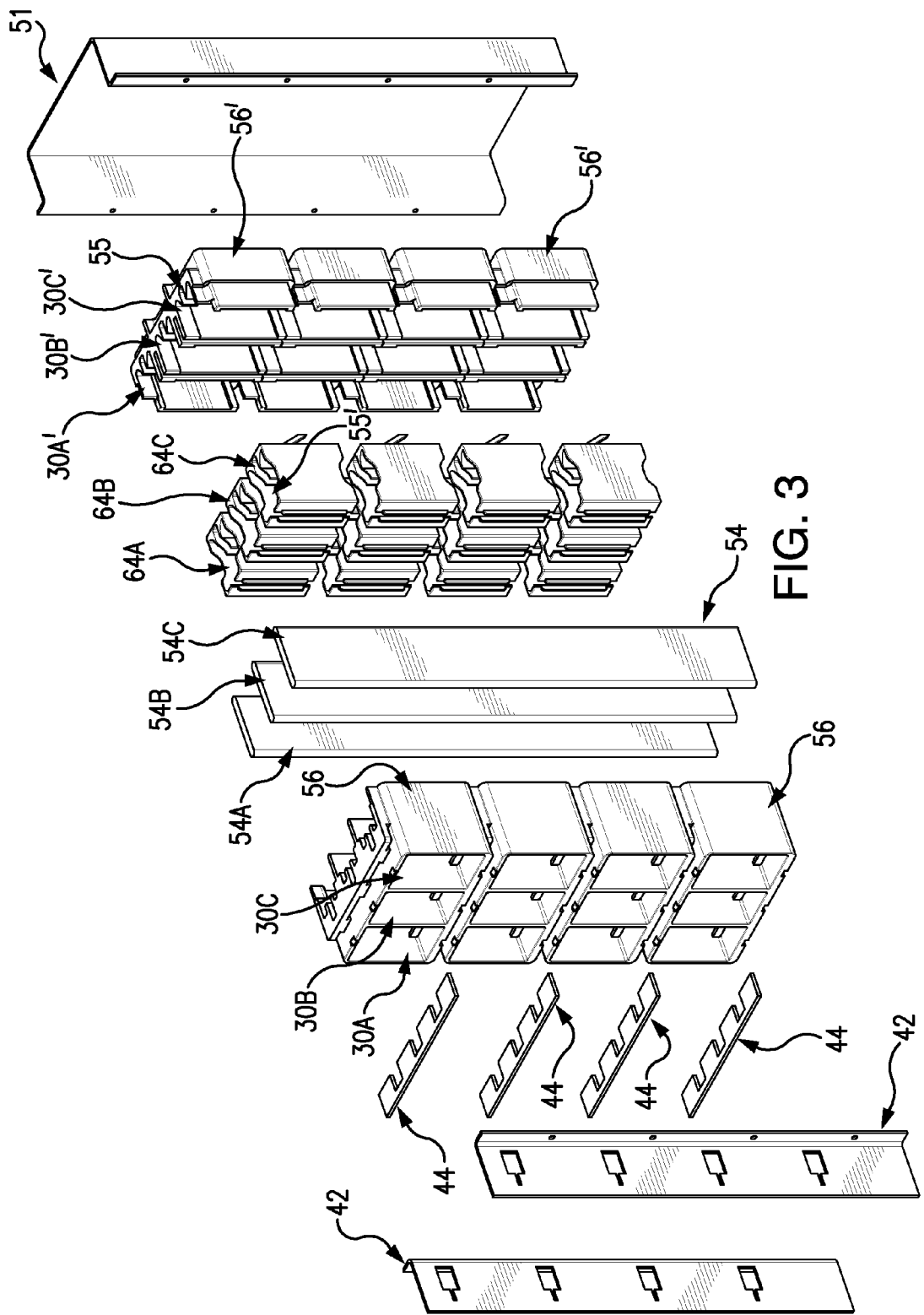
FIG. 3 is an exploded, front perspective view from the right side, of a portion of the motor control center (MCC) cabinet of FIG. 1, showing relative positions of a front bus frame, a front portion of the arc attenuating boxes, the vertical bus bars, independently moveable, box-shaped shutters, a rear portion of the arc attenuating boxes, and a rear bus frame.

FIG. 3 is an exploded, front perspective view from the right side, of a portion of the motor control center (MCC) cabinet 60 of FIG. 1, showing a front bus frame comprising two front vertical supports 42 and several horizontal supports 44. In an example embodiment, a front portion 30A, 30B, and 30C of three arc attenuating boxes A, B, and C (shown in FIG. 7), may be grouped together and molded together as a unitary front cover 56, shown also in FIG. 4 and FIG. 7. The front cover 56 is supported by vertically adjacent horizontal supports 44. The front portion 30A, 30B, and 30C of the three arc attenuating boxes A, B, and C fits over the free end of the respective vertical bus bar phases 54A, 54B, and 54C.

A rear portion 30A', 30B', and 30C' of three arc attenuating boxes A, B, and C may be grouped together and molded together as a unitary rear cover 56' (shown in FIG. 7). The rear cover 56' is supported by the rear bus frame 51. The rear portion 30A', 30B', and 30C' of the three arc attenuating boxes A, B, and C, fits over a rear side of the respective vertical bus bar phases 54A, 54B, and 54C.

Figure 6:
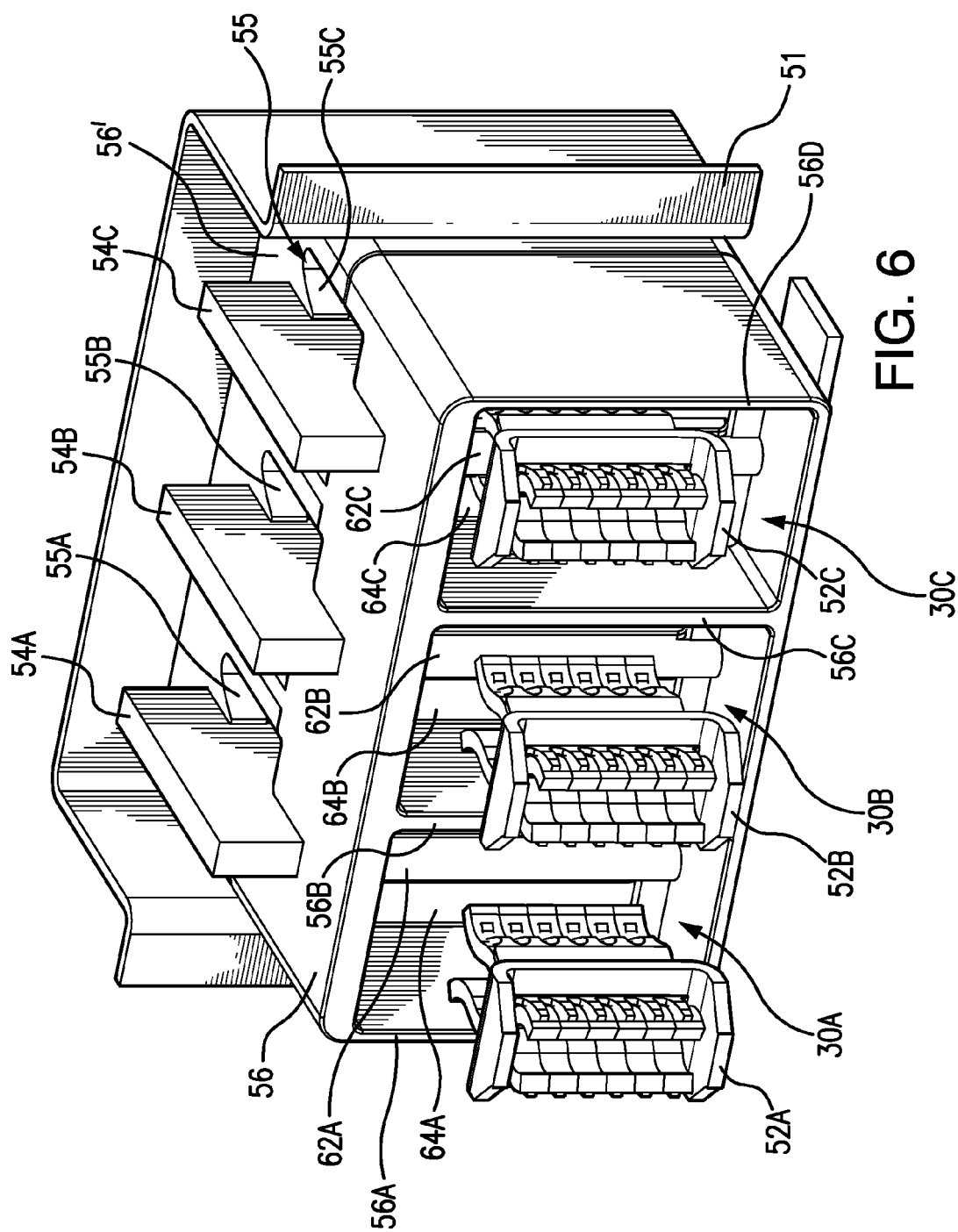
FIG. 6 is a front perspective view from the top, right side of the arc attenuating boxes mounted in the rear bus frame in the motor control center cabinet (not shown).

The unitary front cover 56 and the unitary rear cover 56' are snapped together or otherwise securely joined, so that three snapped-together arc attenuating boxes A, B, and C are formed, as shown in FIG. 6 and FIG. 7. A first snapped-together arc attenuating box A is formed by snapping together the front portion 30A with the rear portion 30A', surrounding an individual, vertical bus bar phase 54A. A second snapped-together arc attenuating box B is formed by snapping together the front portion 30B with the rear portion 30B', surrounding an individual, vertical bus bar phase 54B. A third snapped-together arc attenuating box C is formed by snapping together the front portion 30C with the rear portion 30C', surrounding an individual, vertical bus bar phase 54C. Each arc attenuating box A, B, and C surrounds the vertical bus bar phase at a point of electrical connection between motor control unit 50 and the vertical bus bar.

In the exploded view of FIG. 3, the independently moveable, box-shaped shutters 64A, 64B, and 64C are shown aligned with the front portion and the rear portion of the respective arc attenuating boxes A, B, and C, to slide horizontally within the respective snapped-together arc attenuating boxes A, B, and C, as shown for example in FIG. 7, for shutter 64C and arc attenuating box C.

An example arc attenuating box A, shown in FIG. 7, will surround a first phase vertical bus bar phase 54A (FIG. 2), and is configured to provide a physical barrier to arc flash energy and gases intruding into an adjacent arc attenuating box, for example box B (FIG. 7), which will surround an adjacent second phase bus bar 54B (FIG. 2). For example, side 56B of the arc attenuating box A, shown in FIG. 7, helps separate and sequester the vertical bus bar first phase 54A and also forms a side wall of the adjacent box B. Each arc attenuating box A, B, and C is open at its top and bottom (see e.g. FIGS. 6-7) to form a chimney 55A-55C along the respective vertical bus bar phases 54A, 54B, 54C, to provide directed venting of arc flash energy and gases out of the MCC cabinet 60 (FIG. 1).

The motor control center may have additional rows of arc attenuating boxes, e.g. stacked vertically for the various MCU spaces, or "buckets", with each arc attenuating box surrounding an individual one of the vertical bus bar phases 54A, 54B, 54C. Each arc attenuating box in the additional rows may be open at its top and bottom to form a chimney along a respective vertical bus bar phase, the chimney being aligned with the chimney of an arc attenuating box of other rows of arc attenuating boxes, to provide directed venting of arc flash energy and gases out of the motor control center.

Figure 4:
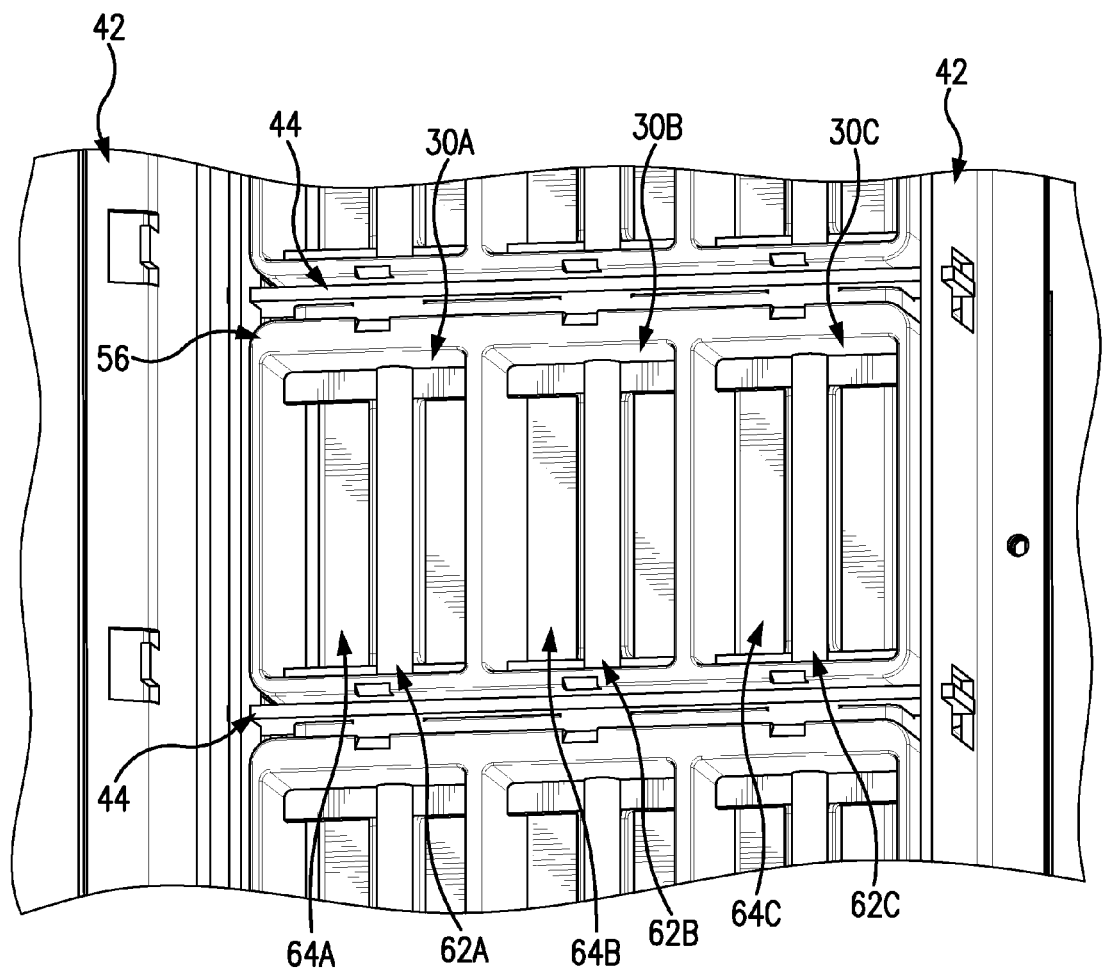
FIG. 4 is a front perspective view from the right side, of the front bus frame, the front portion of the arc attenuating boxes, and the independently moveable, box-shaped shutters in a closed position.

FIG. 4 is a front perspective view from the right side, of the vertical support 42 holding the front portion 30A, 30B, and 30C of a row of the three arc attenuating boxes A, B, and C (FIG. 7) grouped together at a front cover 56 for the bus bars 54A, 54B, and 54C (FIG. 6). The independently moveable, box-shaped shutters 64A, 64B, and 64C are shown in a closed position. The shutter assembly includes an insulator cap 62A, 62B, and 62C on a free end of the respective vertical bus bar phases 54A, 54B, and 54C. The independently moveable, box-shaped shutters 64A, 64B, and 64C are composed of an insulator material. The independently moveable, box-shaped shutters 64A, 64B, and 64C slide horizontally within the arc attenuating boxes A, B, and C. The box-shaped shutters 64A, 64B, and 64C are configured to slide along the respective vertical bus bar phases 54A, 54B, and 54C away from the insulator caps 62A, 62B, and 62C, in response to a force applied by a leading edge of a connector assembly for the motor control unit 50 (shown in FIG. 8), when the motor control unit 50 is being connected to the vertical bus bars. The main body of each box-shaped shutter 64A, 64B, and 64C has an opening, for example 65C of FIG. 7, through which the respective vertical bus bar phase 54A, 54B, and 54C passes when the motor control unit 50 is connected to the vertical bus bar.

FIG. 5A is a front perspective view from the left side, of an independently moveable, box-shaped shutter 64A, 64B, and 64C (shown as 64), showing the opening 65 through which the respective vertical bus bar phase passes when the motor control unit 50 is connected to the vertical bus bar. The figure shows the opening or chimney 55' that is open top to bottom in the box-shaped shutter 64. The opening or chimney 55' of the box-shaped shutter 64 aligns with the top to bottom opening 55 in the arc attenuating box A, B, or C, in both the connected and disconnected positions of the motor control unit 50, as part of a chimney formed along each vertical bus bar.

FIG. 5B is a rear perspective view from the left side, of the independently moveable, box-shaped shutter of FIG. 5A, showing a forward-biasing spring 66 on the rear of the box-shaped shutter 64A, 64B, and 64C (shown as 64), wherein the box-shaped shutter 64 slides horizontally along the vertical bus 54, in response to a force applied by the spring 66, when the motor control unit 50 is disconnected from the vertical bus bar.

FIG. 6 is a front perspective view from the top, right side of a front cover 56 of the front portions 30A, 30B, and 30C of the three arc attenuating boxes A, B, and C (shown in FIG. 7). The front cover 56 is shown snapped together with the rear cover 56' of the rear portions 30A', 30B', and 30C' (shown in FIG. 7) of the three arc attenuating boxes A, B, and C. The rear cover 56' is mounted in the rear bus frame 51 in the motor control center cabinet (not shown). In the figure, female connectors 52A, 52B, 52C are placed in progressive states of connection to the bus bars for explanatory purposes, but will be understood to move as a unit and be in the same state of connection during actual operation. The arc attenuating box A surrounds the vertical bus bar phase 54A. The arc attenuating box B surrounds the vertical bus bar phase 54B. The arc attenuating box C surrounds the vertical bus bar phase 54C. The insulator cap 62A, 62B, and 62C is shown covering the free, front end of each respective bus bar phase 54A, 54B, and 54C. Each independently moveable, box-shaped shutter 64A, 64B, and 64C is located around a respective bus bar phase 54A, 54B, and 54C, and within the arc attenuating boxes A, B, and C that also surround each respective bus bar phase. The shutter assemblies comprising the independently moveable, box-shaped shutters 64A, 64B, and 64C and respective insulator caps 62A, 62B, and 62C, prevent access to the respective bus bars 54A, 54B, and 54C when the motor control unit 50 is in the disconnected position, and allow access to the respective bus bars 54A, 54B, and 54C when the motor control unit 50 is in the connected position of FIG. 2.

FIG. 7 shows a row of front portions 30A, 30B, and 30C of three arc attenuating boxes A, B, and C, the front portions 30A, 30B, and 30C being grouped together as a first front cover 56. Each front portion 30A, 30B, and 30C of the first arc attenuating boxes is configured to fit over a free end of a respective one of three vertical bus bar phases 54A, 54B, and 54C shown in FIG. 6.

The figure also shows a row of rear portions 30A', 30B', and 30C' of the three arc attenuating boxes A, B, and C being grouped together as a rear cover 56'. Each rear portion 30A', 30B', and 30C' of the arc attenuating boxes is configured to fit over a rear end opposite to the free end of a respective one of the plurality of vertical bus bar phases 54A, 54B, and 54C shown in FIG. 6.

The front cover 56 and the rear cover 56' are configured to snap together, with the front portion 30A, 30B, and 30C of the arc attenuating boxes fitting over the free end of the vertical bus bar phases and the rear portion 30A', 30B', and 30C' of the arc attenuating boxes fitting over the rear end of the vertical bus bar phases, each arc attenuating box surrounding an individual vertical bus bar phase.

The front cover 56 has vertical wall sides 56A, 56B, 56C, and 56D with a rear-facing mating surface 71. The rear cover 56' has vertical wall sides 56A', 56B', 56C', and 56D' with a front-facing mating surface 72. The rear-facing mating surface 71 of the front cover 56 is configured to mate and interlock with the front-facing mating surface 72 of the rear cover 56' to form the internal sides of the arc attenuating boxes A, B, and C.

The insulator caps, collectively 62, are positioned within the front cover 56 and fit on the front, free end, of their respective bus bars 54, when assembled. The insulator caps 62A, 62B, and 62C may be formed as an integral part of the front cover 56. Alternately, the insulator cap may be a coating of insulator material on the free end of the respective vertical bus bars.

FIG. 8 is a top, rear perspective view from the right, of the motor control unit 50, showing the female connectors 52A, 52B, and 52C, sometimes called "clusters", with their leading edges projecting out in a position to apply a force on the respective shutter 64A, 64B, and 64C to slide the shutter along the bus bar away from the insulator cap, when in the connected position. In an alternate embodiment, the connector assembly may be a female connector and one or both of a connector protector 53A-53C surrounding the female connector, and a fixed shroud 57A-57C surrounding the connector protector. In an alternate embodiment (not shown), a leading edge of a connector protector surrounding the female connector, applies the force on the shutter to slide the shutter along the vertical bus bar away from the insulator cap, when in the connected position.

Although specific example embodiments of the invention have been disclosed, persons of skill in the art will appreciate that changes may be made to the details described for the specific example embodiments, without departing from the spirit and the scope of the invention.

The invention claimed is:

1. A passive arc control system for a motor control center, comprising:

an arc attenuating box surrounding an individual, vertical bus bar phase at a point of electrical connection between a circuit interrupting device and the vertical bus bar, sides of the arc attenuating box separating and sequestering one vertical bus bar phase from an adjacent vertical bus bar phase, the arc attenuating box being configured to provide a physical barrier to arc flash energy and gases intruding into an adjacent arc attenuating box surrounding an adjacent bus bar, the arc attenuating box being open at its top and bottom to form a chimney along the vertical bus bar to provide directed venting of arc flash energy and gases out of the motor control center; and a shutter assembly including an insulator cap on a free end of the vertical bus bar and an independently moveable, box-shaped shutter composed of an insulator material, which slides horizontally within the arc attenuating box, the box-shaped shutter being configured to slide along the vertical bus bar away from the insulator cap, in response to a force applied by a leading edge of a connector assembly for the circuit interrupting device, when the device is being connected to the vertical bus bar, the main body of the box-shaped shutter having an opening through which the vertical bus bar passes when the device is connected to the vertical bus bar, the box-shaped shutter being open top to bottom, with the opening aligned with the top to bottom opening in the arc attenuating box, in both the connected and disconnected positions of the device, as part of the chimney formed along the vertical bus bar.

2. The passive arc control system for a motor control center of claim 1, wherein the moveable, box-shaped shutter being configured to slide horizontally along the vertical bus bar toward the insulator cap, in response to a force applied by a spring, when the circuit interrupter device is disconnected from the vertical bus bar, the insulator cap being configured to closely fit within the opening in the shutter, thereby providing a physical barrier to debris, tools, and operator fingers by denying access to the vertical bus bar.

3. The passive arc control system for a motor control center of claim 1, wherein the arc attenuating box includes a front portion that fits over the free end of the vertical bus bar, the front portion of the arc attenuating box having sides with a rear-facing mating surface, the arc attenuating box further including a rear portion that fits over a rear portion of the vertical bus bar, the rear portion of the arc attenuating box having sides with a front-facing mating surface, the rear-facing mating surface of the front portion of the arc attenuating box being configured to mate with the front-facing mating surface of the rear portion of the arc attenuating box to form the sides of the arc attenuating box.

4. The passive arc control system for a motor control center of claim 3, wherein the insulator cap on the free end of the vertical bus bar is formed as an integral part of the front portion of the arc attenuating box.

5. The passive arc control system for a motor control center of claim 1, wherein the insulator cap is a coating of insulator material on the free end of the vertical bus bar.

6. The passive arc control system for a motor control center of claim 1, wherein a motor control unit configured to be inserted into the motor control center, the motor control unit including a circuit breaker, the motor control unit further having an exterior face of a rear wall of the motor control unit being configured to be located adjacent to the vertical bus bars when the motor control unit has been inserted into the motor control center, the motor control unit including movable connector assemblies for the motor control unit, each of the connector assemblies being configured to electrically connect to a respective vertical bus bar, when the connector assembly is moved toward the power bus.

7. The passive arc control system for a motor control center of claim 1, wherein the connector assembly comprises a female connector and one or both of a connector protector surrounding the female connector, and a fixed shroud surrounding the connector protector.

8. The passive arc control system for a motor control center of claim 7, wherein a leading edge of the female connector applies the force on the shutter to slide the shutter along the vertical bus bar away from the insulator cap, when in the connected position.

9. The passive arc control system for a motor control center of claim 7, wherein a leading edge of the connector protector surrounding the female connector, applies the force on the shutter to slide the shutter along the vertical bus bar away from the insulator cap, when in the connected position.

* * * * *